(12) United States Patent
Iyengar et al.

(10) Patent No.: US 7,979,262 B1
(45) Date of Patent: Jul. 12, 2011

(54) METHOD FOR VERIFYING CONNECTIVITY OF ELECTRICAL CIRCUIT COMPONENTS

(75) Inventors: Srinivasan Iyengar, Round Rock, TX (US); Abhijeet Kolpekwar, New Berlin, WI (US); Chandrashekar L. Chetput, Santa Clara, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 508 days.

(21) Appl. No.: 11/372,292

(22) Filed: Mar. 9, 2006

Related U.S. Application Data

(60) Provisional application No. 60/751,560, filed on Dec. 19, 2005.

(51) Int. Cl.
| G06F 9/455 | (2006.01) |
| G06F 17/50 | (2006.01) |
| G06F 9/44 | (2006.01) |
| G06F 13/10 | (2006.01) |
| G06F 13/12 | (2006.01) |

(52) U.S. Cl. ............................. 703/21; 703/27; 716/106
(58) Field of Classification Search .................... 703/13, 703/14, 15, 16; 716/5
See application file for complete search history.

(56) References Cited

U.S. PATENT DOCUMENTS

| 5,202,841 | A | * | 4/1993 | Tani ................................ 716/5 |
| 5,249,133 | A | * | 9/1993 | Batra ............................... 716/5 |
| 5,351,197 | A | * | 9/1994 | Upton et al. .................... 716/10 |
| 5,473,546 | A | * | 12/1995 | Filseth ............................. 716/8 |
| 6,405,351 | B1 | * | 6/2002 | Steiss et al. ...................... 716/5 |
| 6,421,808 | B1 | * | 7/2002 | McGeer et al. ............... 716/100 |
| 2002/0124234 | A1 | * | 9/2002 | Linz ............................... 716/18 |
| 2004/0193388 | A1 | * | 9/2004 | Outhred et al. ................. 703/1 |
| 2005/0144578 | A1 | * | 6/2005 | Decloedt .......................... 716/5 |
| 2005/0198600 | A1 | * | 9/2005 | Hasegawa ........................ 716/5 |
| 2006/0074626 | A1 | * | 4/2006 | Biswas et al. .................... 704/8 |
| 2007/0061764 | A1 | * | 3/2007 | Adams et al. .................... 716/5 |

OTHER PUBLICATIONS

Accellera, Verilog-AMS, Language Reference Manual, Analog & Mixed-Signal Extensions to Verilog HDL, Version 2.2, Nov. 2004.

* cited by examiner

*Primary Examiner* — David Silver
(74) *Attorney, Agent, or Firm* — Vista IP Law Group, LLP

(57) ABSTRACT

Connections between digital blocks and other circuit components, such as power supplies and clocks, are verified using a discrete property or object, such as a discrete discipline. A discrete discipline is defined for each value of an operating parameter, such as voltage or clock speed, that is used in a circuit design. Each discrete discipline is propagated throughout respective nets using bottom-up and/or top-down propagation. As a result, each digital net is associated with a power supply value through its corresponding discrete discipline. A determination is made whether two digital nets are connected to each other within the same digital island. If so, a determination is made whether the digital nets are compatible. If they have conflicting discrete disciplines, then they are not compatible and an error report or signal can be generated to identify the incompatibility and its location. Compatibility checks can disregard grounded digital nets. Verifications can be performed for both digital and mixed signal digital/analog designs without running simulations.

50 Claims, 16 Drawing Sheets

(Step 250 of Figure 2)

(Step 260 of Figure 2)

|   | Higher level net | Lower level port | Step 230<br>After Verilog-AMS semantics applied to determine domain / discipline of net | Step 250<br>After discrete discipline propagation applied on nets within same digital island | Step 260<br>Discrete discipline compatibility check applied on nets within same digital island (except digital grounds) |
|---|---|---|---|---|---|
| 1 | D | D | May or may not be compatible<br><br>Within same digital island | No propagation necessary | If the same discrete disciplines, then compatible.<br><br>If different discrete disciplines, then not compatible. |
| 2 | D | U | May or may not be compatible<br><br>Within same digital island | Digital 'D' propagated from higher level net to lower level port | Compatible |
| 3 | D | A | Incompatible domains. Connection element inserted based on Verilog-AMS<br><br>New digital island starts from higher level net | N/A | N/A |
| 4 | A | D | Incompatible domains<br><br>Connection element inserted based on Verilog-AMS<br><br>New digital island starts from lower level port | N/A | N/A |
| 5 | A | U | N/A | N/A | N/A |
| 6 | A | A | N/A | N/A | N/A |

Figure 6A - Table Summarizing Processing Net / Port Connections

| | Higher level net | Lower level port | Step 230<br>After Verilog-AMS semantics applied to determine domain / discipline of net | Step 250<br>After discrete discipline propagation applied on nets within same digital island | Step 260<br>Discrete discipline compatibility check applied on nets within same digital island (except supply0) |
|---|---|---|---|---|---|
| 7 | U | D | May or may not be compatible<br><br>Within same digital island | Digital discipline 'D' propagated from lower level port to higher level net | Compatible |
| 8 | U | U | May or may not be Compatible<br><br>Within same digital island | If digital discipline is present within same digital island as a net, it is propagated to higher level net and lower level port based on discrete discipline propagation algorithm<br><br>If no digital discipline on any net within same digital island, higher level net and lower level net remain "U" (without a discipline) | Compatible if higher level net is U and lower level port is U<br><br>All other cases: same as row #1 |
| 9 | U | A | N/A | N/A | N/A |

Figure 6B (Applying Semantics with Default Discipline Resolution)

(Result of Bottom-Up – Default Discipline Resolution)

(Result of Top-Down – Default Discipline Resolution)

(Result of Compatibility Check – Default Discipline Resolution)

Result of Applying Step 230

(Result of Bottom-Up – Detailed Discipline Resolution)

(Result of Top-Down – Detailed Discipline Resolution)

(Result of Compatibility Check – Detailed Discipline Resolution)

METHOD FOR VERIFYING CONNECTIVITY OF ELECTRICAL CIRCUIT COMPONENTS

CROSS-REFERENCE TO RELATED APPLICATION

The present application claims priority under 35 U.S.C. §119 of U.S. Provisional Application No. 60/751,560, filed Dec. 19, 2005, entitled "Method for Verifying Connectivity of Electrical Circuit Components," the contents of which are incorporated herein by reference as though set forth in full.

FIELD OF THE INVENTION

The present invention relates generally to verifying connections of components of a circuit design and, more particularly, to verifying circuit connections by defining discrete properties for values of operating parameters of the circuit design.

BACKGROUND

Chipsets requiring multiple power supplies or operating voltages are very common. Such chipsets can be complex and include several millions of transistors, covering Radio Frequency (RF) and analog base band platforms. Many designers who design big D/big A chipsets have a digital centric top-down flow. More particularly, the design starts with a high level type of module description (e.g., in SystemC, SystemVerilog, or Verilog/VHDL), which leads to a lower level, synthesizable Register Transfer Level (RTL) code for defining digital circuits. The RTL specifications are used to generate gate-level netlists. It is important to verify that various blocks of the circuit design are correctly connected to particular power supplies so that the circuit design operates as intended. However, after circuit synthesis, digital blocks that require different supply sensitivity are often scattered all over the chip, which can complicate verifying that particular blocks are connected to the correct supply.

In cases in which all of the digital modules use the same supply sensitivity, then verification is straight forward and can be completed using, for example, "event" driven simulators. However, in most cases, chipsets use multiple supply sensitivities and, therefore, it can be very difficult to verify connectivity and functionality of multiple different supplies with known digital simulators. For example, a typical "2.5G" platform chipset includes modules such as "smartPOWER, DSP core, ARM core, global switching module, etc". Each module has two to three supply voltages and uses schemes such as "state-retention" techniques. It is important to verify the functionality of these "modules" not only as a function of their inputs, but also as a function of their supply-domains. These tasks must account for a large number of transistors, e.g., 30 million or more transistors, after the synthesis has been performed. Using conventional verification approaches for this purpose can be very difficult.

In order to address these difficulties, designers often defer such checks to transistor level verification using technologies such as fastSPICE/fastMOS. One shortcoming of these known approaches, however, is that they require substantial simulation time and computing resources. Further, they may not be able to cover the required portions of the circuit design. Another known technique designers have used to reduce costs is verifying only critical design paths. However, these known techniques can impact verification quality.

Since there is no acceptable technique that can quickly and accurately verify power supply connectivity in chip sets, designers have often resorted to "fooling" simulators. For example, one known technique is to use "stubs" to blank out cells and create multiple such configurations to verify chip functionality in bits and pieces. This is otherwise known as "manual partitioning." However, the interdependencies between such cells are ignored since it is time-consuming to add meaningful behavioral constructs to these stubs to capture the functionality. Another known technique involves verification leads writing "analog-behavioral" models and using these models to speed up simulations and capture basic functionality. However, functional coverage using this technique can be improved, and it can be difficult to calibrate an analog-behavioral model with a SPICE netlist.

Thus, known verification techniques suffer from a number of shortcomings, including performing simulations to verify correct supply connectivities, requiring design modifications and performing verifications with reduced or unsatisfactory functional coverage. Further, known verifications techniques may not follow standards, require specific designs, and increased verification costs and time, leading to inefficient verifications.

Accordingly, there exists a need for a method of allowing designers to complete circuit verifications in a time and cost efficient manner without running simulations, while achieving the desired functional coverage. Embodiments of the invention fulfill these unmet needs.

SUMMARY

According to one embodiment, a method for verifying circuit design connections includes defining a discrete property for each value of an operating parameter of the circuit design, associating a discrete property with respective digital nets of the circuit design so that digital nets are associated with respective values; and verifying connections between components of the circuit design based on whether discrete properties associated with the components are compatible.

According to another embodiment, a method for verifying circuit design connections includes defining a discrete discipline for each value of an operating parameter of the circuit design and associating a discrete discipline with respective digital nets in the circuit design so that digital nets are associated with respective values. The method also includes identifying digital nets within a digital island of the circuit design that are associated with an undetermined discipline. A digital island includes digital nets that extend through different hierarchical levels of the circuit design. The method also includes associating each identified digital net with a discrete discipline so that each identified digital net is associated with a corresponding value and verifying connections between circuit design blocks based on whether discrete disciplines associated with the blocks are compatible.

In accordance with yet a further alternative embodiment is a method for verifying connections between circuit design blocks that operate at different voltages. The method includes defining a discrete discipline for each voltage and associating discrete disciplines with respective digital nets so that digital nets are associated with respective voltages. Digital nets of the circuit design that are not associated with a discrete discipline are identified, and each identified digital net is associated with a discrete discipline so that each identified digital net is associated with a corresponding voltage. Connections between circuit design blocks are verified based on whether discrete disciplines associated with the blocks are compatible without performing a simulation.

Another alternative embodiment is a method for verifying connections between circuit design blocks that operate using different clock speeds. The method includes defining a discrete discipline for each clock speed and associating discrete disciplines with respective digital nets so that digital nets are associated with respective clock speeds. Digital nets of the circuit design that are not associated with a discrete discipline are identified, and each identified digital net is associated with a discrete discipline so that each identified digital net is associated with a corresponding clock speed. Connections between circuit design blocks are verified based on whether discrete disciplines associated with the blocks are compatible without performing a simulation.

In various embodiments, digital nets within a digital island of the circuit design that are not associated with a discrete property are identified and associated with a discrete property. Discrete properties, such as discrete disciplines, can be propagated between hierarchical levels so that identified digital nets are associated with a discrete property. Verifying connections between circuit design components can be based on whether operating parameter values of discrete properties are compatible and can be performed.

Embodiments can be implemented without performing simulations and without analyzing digital grounds. Embodiments are also applicable to digital circuit designs as well as digital/analog mixed-signal circuit designs.

BRIEF DESCRIPTION OF THE DRAWINGS

FIGS. 6A-B form a table summarizing disciplines and domains of a net, propagating discrete disciplines, and checking compatibility of disciplines according to one embodiment;

DETAILED DESCRIPTION OF ILLUSTRATED EMBODIMENTS

Embodiments of the invention are directed to a method of verifying connections between digital blocks and other circuit components, such as power supplies, clocks and other components that influence design behavior. This specification refers to power supplies and voltages for purposes of explanation and illustration, in a non-limiting manner. Embodiments define a discrete property (such as a discipline in Verilog-AMS) for each power supply voltage of the circuit design. The discrete discipline is assigned to or associated with digital nets so that these nets are associated with respective voltages. Nets with undetermined disciplines are assigned a discrete discipline. Connections between blocks and power supplies are verified based on whether the discrete disciplines associated with the components are compatible, e.g., whether the domains and/or voltage values are compatible. Thus, embodiments advantageously eliminate the need for simulations, which can require substantial time and costs. Further embodiments advantageously eliminate analysis of digital grounds, resulting in improved verification efficiency, and can be applied to digital circuit designs, as well as digital/analog mixed-signal circuit designs.

Figure 1:
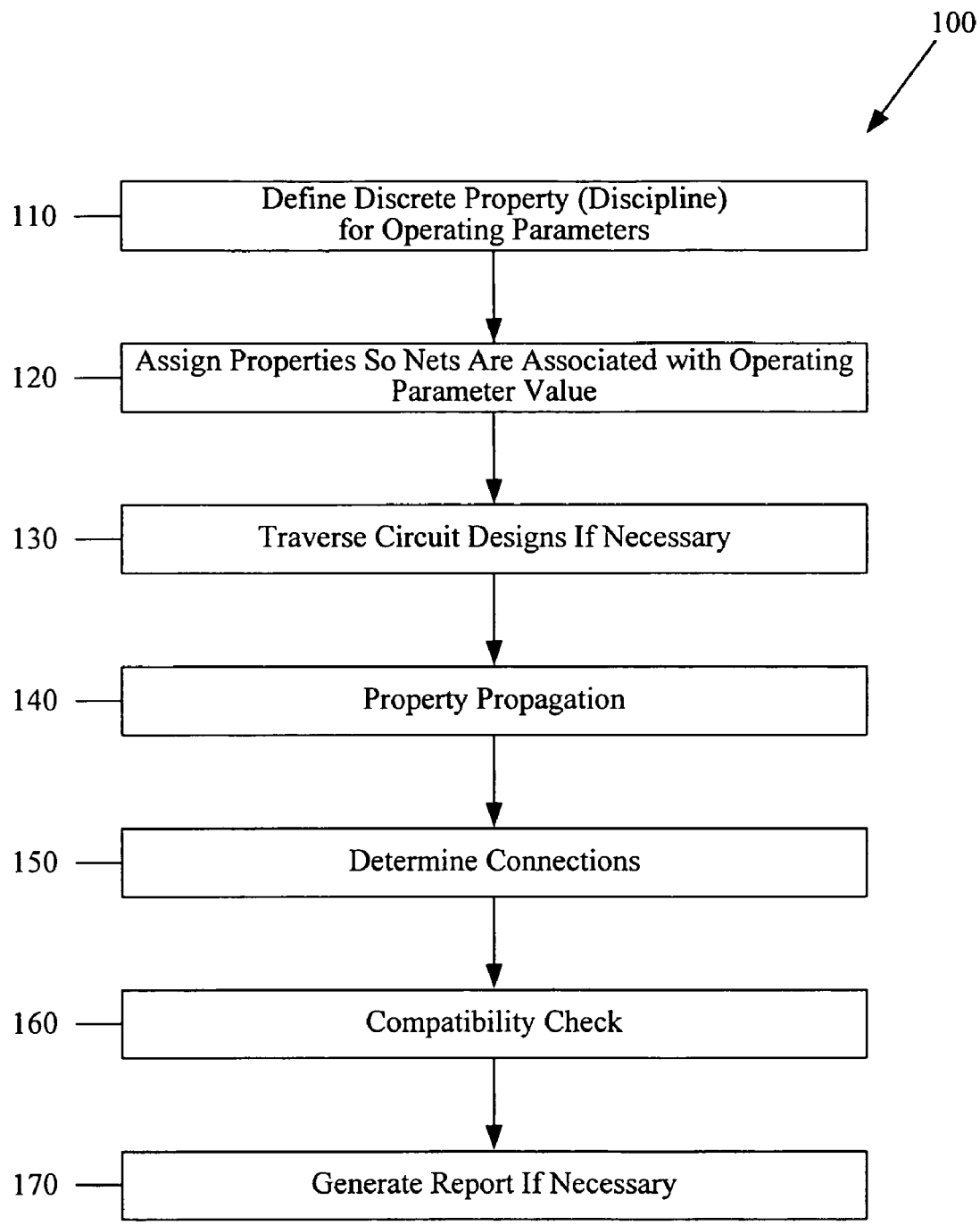
FIG. 1 is a flow chart illustrating a method of verifying power circuit connections according to one embodiment.

One embodiment of a method 100 for verifying supply voltages is illustrated in FIG. 1. In step 110, a discrete (digital) property or object (generally "discrete property" or "property") is defined for different supply values. According to one embodiment, a discrete property is a discipline of Verilog-AMS. This specification refers to a discipline for purpose of explanation, but persons skilled in the art will appreciate that other discrete properties and objects can be used, and that other properties of other languages can be used. Thus, a discipline of Verilog-AMS is an exemplary discrete property for use with embodiments.

A discipline indicates the domain of a net, i.e., whether a net is discrete (digital) or continuous (analog). Further, a discipline is associated with a particular value. For example, a first discipline can be defined for a 1.8 volt power supply, and a second discipline can be defined for 3.2 volt power supply. Indeed, other number of disciplines or other properties or objects can be defined for other numbers of power supply voltages and other operating parameters (such as clock speeds) of the circuit design.

In step 120, discrete properties or disciplines are applied or assigned to or associated with respective digital nets to reflect their corresponding power supply voltages. According to one embodiment, a discrete discipline is applied to each digital net so that each digital net is associated with a supply voltage. According to another embodiment, a discrete discipline is applied to a plurality of digital nets. Disciplines can be applied to different portions of the circuit as needed.

In step 130, circuit designs may be traversed in order to process hierarchical design data to comply with standard language semantics. Traversal of the circuit design can be from the bottom-up and/or form the top-down.

In step 140, property or discipline propagation is performed for nets that belong to a digital domain but that do not have a discipline. Thus, undetermined or unknown disciplines are replaced with discrete disciplines. As a result, nets that were previously associated with an unknown domain or unknown discipline are associated with a discrete discipline or digital domain.

In step 150, a determination is made whether two nets are connected to each other. The nets (and their connections) can be of any type, e.g., analog or digital. In step 160, if two or more nets are connected to each other, a determination is made whether the nets are compatible based on their associated properties. As discussed above, nets can be analog or digital, but compatibility checks are performed exclusively on digital nets. According to one embodiment, the compatibility check is performed only on digital nets that are within the same digital island or group of digital nets. A net refers to a single hierarchical segment of a signal, and a signal is one or more net segments that are connected through the hierarchy. A net in one hiearchical level can be connected to another net in the level below or above it. A combination of such digital net connections through the hierarchy is referred to as a digital island. The boundary connection of a digital island can be a connection to an analog net or terminate as a leaf or a top-level connection.

Embodiments of the invention address shortcomings of known language standards, which define certain domain-level compatibility checks but do not define compatibility checks for digital to digital connections. According to one embodiment, two nets are compatible based on whether the properties or disciplines are compatible. For example, verifying compatibility can be based on whether domains of disciplines are compatible and/or whether operating parameter values (e.g., voltage values) or other sensitivity requirements are compatible. Thus, disciplines having analog and digital domains are not compatible, but disciplines having digital domains may be compatible. For example, disciplines having digital domains and that are associated with the same voltage values are compatible, and disciplines having digital domains and that are associated with different voltages or different sensitivity requirements are not compatible. Other compatibility results are summarized in FIGS. 6A-B, which are related to an embodiment involving a discipline used in Verilog-AMS.

In step 170, if the nets are incompatible, then an error report or signal can be generated to identify the incompatibility and its location. For example, if disciplines are defined for supply voltages of 1.8 volts and 3.2 volts, an incompatibility may result when a first net that is configured for 1.8 volt is erroneously designed to be connected to a 3.2 volt supply.

Incompatibilities can advantageously be identified and resolved without running simulations. Thus, embodiments provide a more efficient verification method, which reduces the time and costs associated with known simulations. Further, embodiments advantageously verify connectivities in blocks that function under different operating conditions or constraints, such as different power supplies, different clocks, etc., without relying on signal values and simulations. Embodiments effectively function without relying on particular language or design functionality and reduce verification costs and improve verification coverage and accuracy. Connectivity problems can be identified early in the design cycle so that design iteration costs can be reduced. These significant benefits are achieved while increasing or maximizing coverage.

In order to further illustrate embodiments of the invention, FIGS. 2-15 illustrate how embodiments can be implemented using a discrete discipline of Verilog-AMS. Persons skilled in the art will appreciate that embodiments can also be implemented using various hardware description programming languages, including but not limited to Verilog (using an attribute), Verilog-AMS (using a discipline), System Verilog, System C and VHDL-AMS. Thus, the description of embodiments that utilize a discipline of Verilog-AMS are provided for purposes of explanation, not limitation.

Example Implementation Using Verilog-AMS

According to one embodiment, a method of verifying circuit connections is implemented using Verilog-AMS and applied to verifying power supply connections. When embodiments are implemented using Verilog-AMS, different discrete disciplines are used to identify nets that require different supply sensitivities.

A discipline is an object that is associated with nets and that is used to indicate whether a given net is discrete (digital) or continuous (analog). Discrete and continuous domains are specified in the discipline definition. Thus, a discipline is defined in terms of domain, and a discipline is either of analog domain or of digital domain. A discipline also describes related properties that belong to a domain, e.g., an electrical domain may be described in terms of current, voltage, etc. The related properties can differ depending on the particular application. Further, disciplines can be pre-determined or defined by a user. A net, by default, is domainless or undefined. A net can become a digital domain net without any associated discipline. Nets can also be associated with a discipline and the corresponding domain and sensitivity value defined by the discipline.

Following is one example of a discrete or digital discipline definition called 'logic' and an analog discipline definition called 'electrical':

discipline logic
        domain discrete
    enddiscipline
    discipline electrical
        potential Voltage;
        flow Current;
    enddiscipline Following is sample code of a module name "foo" that declares nets n1 and n2 to be associated with a particular discipline:

module foo;
        logic n1;
        electrical n2;
        <other statements>
    endmodule The above Verilog-AMS module "foo" shows a net "n1" that is associated with a digital discipline named "logic" and net "n2" is associated with an analog discipline named "electrical."

Verilog-AMS standard allows nets to be declared without any disciplines (and without any domains). These types of nets are referred to as domainless nets. The domain or discipline of these types of nets is resolved during the discipline resolution process, during which undetermined disciplines are replaced by discrete disciplines, e.g., when a discrete discipline is propagated to replace the undetermined discipline with a discrete discipline.

Embodiments can use two types of discipline resolution methods—a basic (default) discipline resolution method and detailed discipline resolution method. The default resolution method is generally used when the designer wants to propagate analog or digital disciplines up the hierarchy. The detailed resolution method is generally used when the designer wants to propagate analog disciplines both up and down the hierarchy and enables domainless nets to acquire analog disciplines.

Following discipline resolution, information about the domain and discipline of nets in the design and the analog/digital partitions in the design are available. Regarding the first type of information, the domain and discipline of nets in the design, every net in the design belongs to one of the following three types: 1. nets that are associated with a discrete or digital discipline and that are of digital domain, 2. nets that are associated with an analog discipline and are of analog domain and 3. nets that are not associated with any discipline but are of digital domain. Regarding the second type of information, analog and digital boundaries in the design are also clearly identified. Digital nets that are connected to each other form a digital island, and analog nets that are connected to each other form an analog island.

Figure 2:
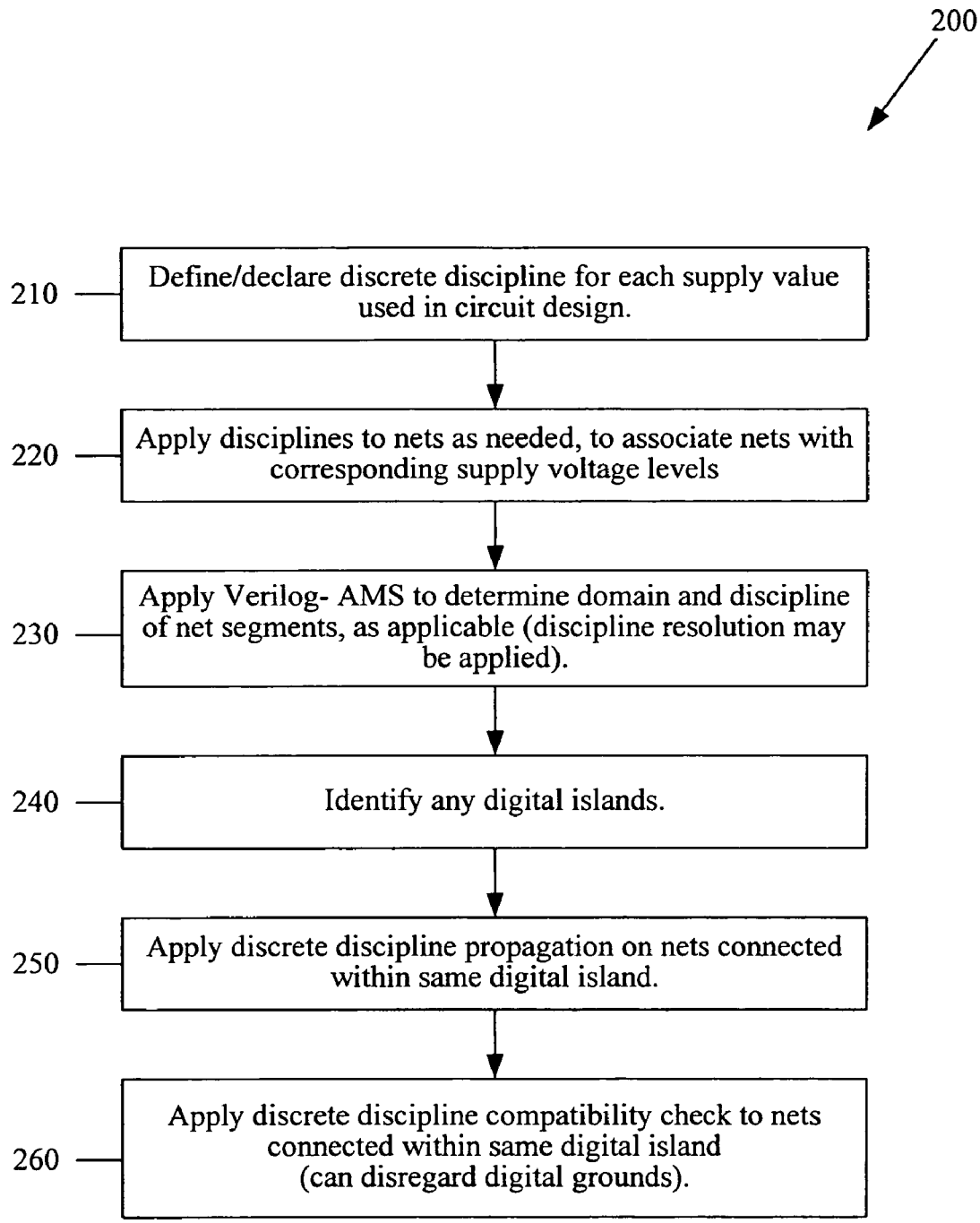
FIG. 2 is a flow chart illustrating a method of verifying circuit connections using a discrete discipline of Verilog-AMS according to one embodiment.

One example of how embodiments of a method 200 can be implemented using Verilog-AMS is shown in FIG. 2. In step 210, a discrete discipline is defined or declared for each power supply voltage in the design. The disciplines are applied to the various nets to reflect the power supply voltages under which they operate. Thus, the nets are associated with a discipline and the corresponding domain and supply voltage value.

Examples of two discrete or digital disciplines that can be defined for power supplies that output 1.8 volts and 3.2 volts are provided below:
    discipline logic1_8
        domain discrete
    enddiscipline
    discipline logic3_2
        domain discrete
    enddiscipline The exemplary first discipline is a discrete discipline named "logic1_8." The exemplary second discipline is also a discrete discipline and is named "logic3_2." In step 220, the discrete disciplines are applied to various digital nets in the design to reflect supply voltage levels under which they operate. Thus, the first discipline "logic1_8" is applied to or associated with a net with a supply voltage of 1.8 volts, and the second discipline "logic3_2" is applied to or associated with a net with a supply voltage of 3.2 volts.

In step 230, Verilog-AMS language semantics are applied to determine the domain and discipline of the various net segments. A discipline resolution method (such as default, detailed and other suitable resolution method) may be applied as needed. Following is sample code showing how these disciplines can be assigned to a net:
    module foo;
        logic1_8 n1;
        logic3_2 n2;
        assign n1=1'b1;
        assign n2=1'b0;
    endmodule The above code shows discipline logic1_8 (1.8 volts) being applied to net n1, and discipline logic3_2 (3.2 volts) being applied to net n2 with bit values 1 and 0 being assigned to respective nets n1 and n2

In step 240, digital islands are identified. A digital island is a block in a design in which all of the nets are digital nets. Thus, a digital island does not include analog nets, but may be bounded by analog nets. In step 250, a discrete discipline propagation method is applied to nets connected within the same digital island. This ensures that nets having undetermined disciplines, or nets that do not have a known discipline or analog or digital domain, are assigned to or replaced with a known discipline, e.g., a digital discipline. The propagation step is independent of steps 230 (applying language semantics) and 240 (identifying digital islands).

In step 260, the compatibility of disciplines is checked with regard to nets that are connected within the same digital island. According to one embodiment, the compatibility check can disregard digital grounds, one example of which is a supply0 net in Verilog (IEEE Standard 1364) and variations thereof. Thus, it is not necessary to apply the discipline compatibility check to supply0nets and nets that are connected to supply0 since nets connected to supply0 within a digital island can be disabled. For purposes of explanation, not limitation, this specification refers to Supply0 digital nets of Verilog and variations thereof as an exemplary digital ground, and persons skilled in the art will appreciate that embodiments can be configured to disregard other digital grounds.

Figure 3:
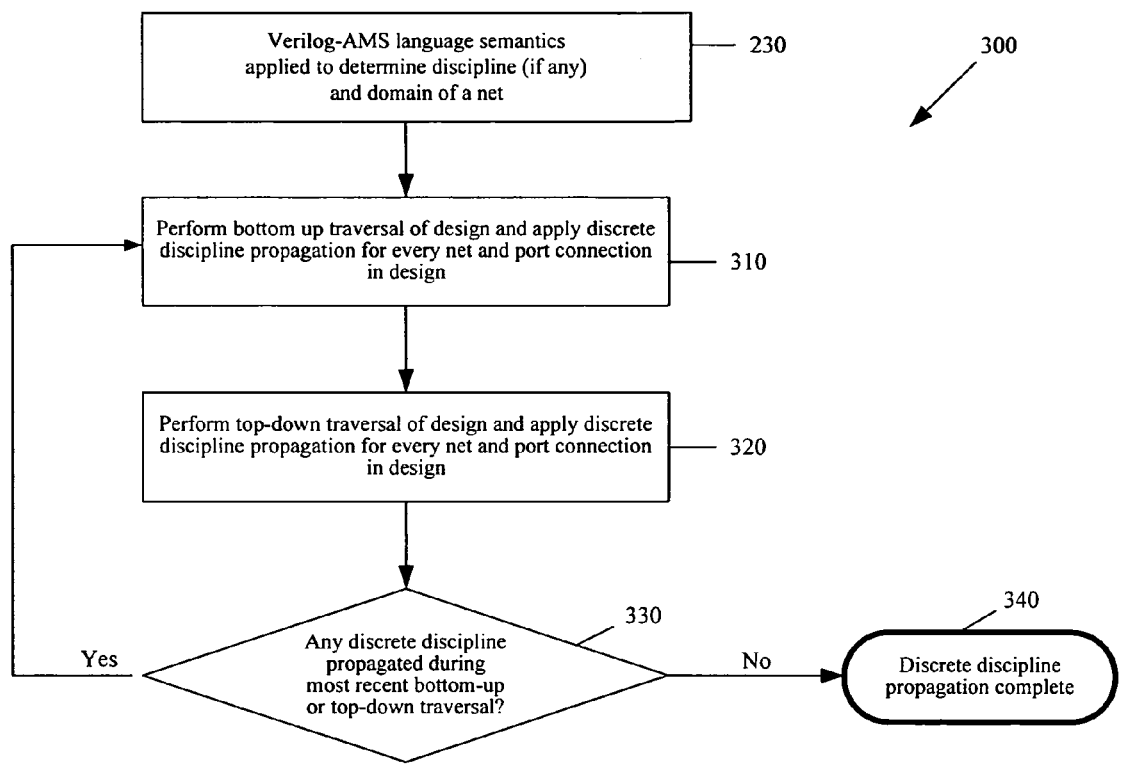
FIG. 3 is a flow chart illustrating a method of traversing a circuit design and propagating discrete disciplines to undetermined disciplines according to one embodiment.

Discipline Propagation—Replacing Undetermined Discipline with Discrete Discipline FIG. 3 is a flow chart further illustrating a method 300 of traversing a circuit design and propagating disciplines to various nets of the design. In step 310, a circuit design is traversed from the bottom of the design to the top of the design. Discrete discipline propagation methods can be applied for each net and port in the design. In step 320, the design is traversed from the top of the design to the bottom of the design. Discrete discipline propagation methods can be applied for each net and port connection in the design. Traversing a circuit design may be performed by traversing the circuit from the bottom first or from the top first. Alternatively, the circuit design can be traversed using both top-down and bottom-up traversals.

In step 330, a determination is made whether any discrete discipline was propagated during any design traversal, i.e., whether a digital discipline was propagated to replace or convert an undetermined discipline. If not, then in step 340, all of the disciplines have been propagated and discipline propagation is complete. If so, then the process can repeat beginning with step 310 until all disciplines are propagated and all of the undetermined disciplines are replaced with discrete disciplines.

Figure 4:
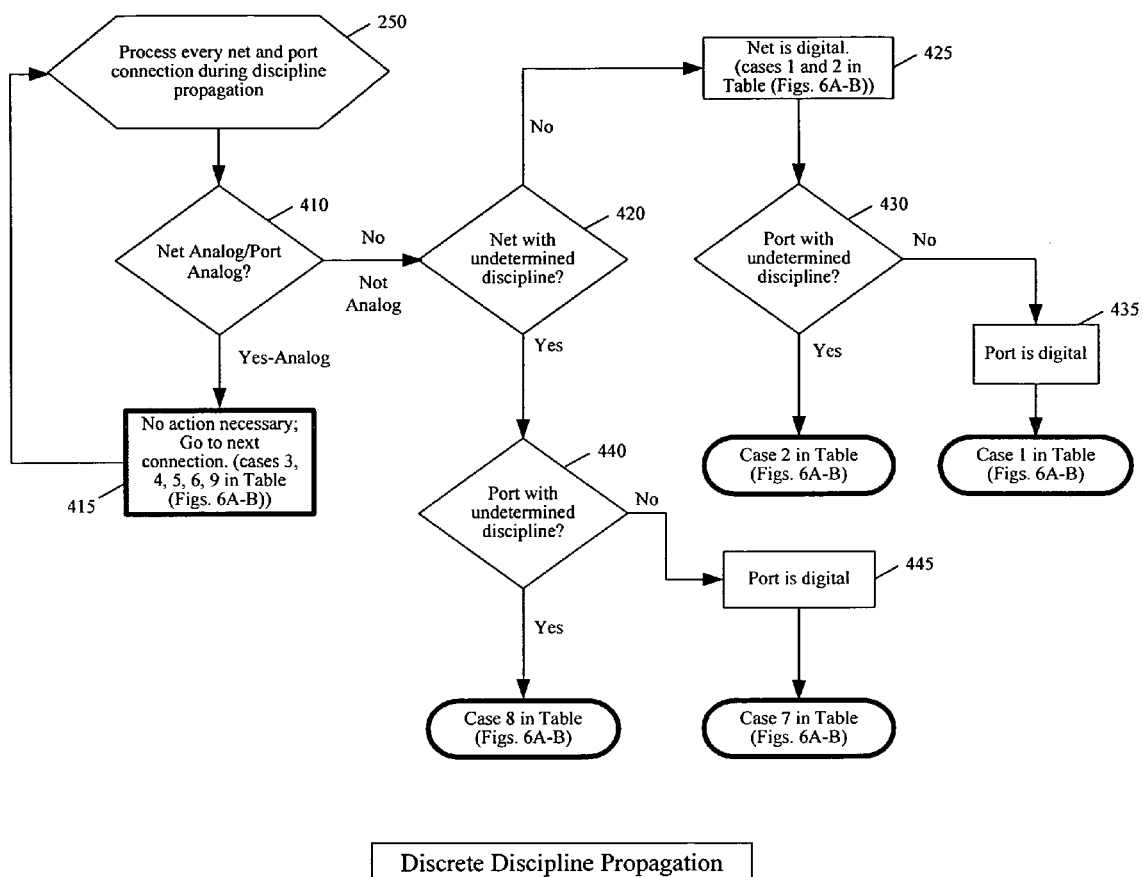
FIG. 4 is a flow chart further illustrating a method of propagating discrete disciplines to undetermined disciplines according to one embodiment.

FIG. 4 is a flow chart illustrating application of a discrete discipline propagation (step 250 of FIG. 2) with reference to summaries presented in a Table shown in FIGS. 6A-B. In particular, FIG. 4 illustrates propagating discipline information (step 250 of FIG. 2) depending on whether the net and port have digital, analog or undetermined disciplines. FIGS. 6A-B form a table that summarizes different net and port states and the result of steps 230 (determine domain/discipline), 250 (propagation) and 260 (compatibility). In FIGS. 6A-B, a discipline/domain of a net or port is identified as "D" when it is digital, "A" when it is analog, and "U" when it is undetermined.

Referring to FIG. 4, in step 410, a determination is made whether a net is analog and whether a port is analog. If either the net or the port is analog, then in step 415, no action is necessary since the compatibility check is performed exclusively on digital nets. Thus, the next connection is analyzed, and the method loops back to step 250. This situation corresponds to cases or rows 3-6 and 9 of the Table in FIGS. 6A-B, each of which has an analog discipline.

Otherwise, step 410 results in a determination that at least one of the net and the port is not analog (i.e., it is digital or undetermined), and the method proceeds to step 420. In step 420 a determination is made whether the net is associated with an undetermined discipline. A net is associated with an undetermined discipline when it does not have a domain (analog or digital) or discipline associated with it.

In step 425, it is determined that the discipline applied to the net is not undetermined. Rather, it is known and it can be determined that the net is digital. Next, in step 430, a determination is made whether the lower level port is associated with an undetermined discipline.

If not, then in step 435, the port is digital. This situation corresponds to case or row number 1 in the Table shown in FIGS. 6A-B, in which both the higher level net and the lower level port are digital (D). In row or case 1, after step 230, the net and lower level port may or may not be compatible, but are within the same digital island. In this case, step 250 is not necessary because the nets are both digital and are not undetermined, and after the compatibility check in step 260, the nets are compatible if the disciplines are the same, but are otherwise incompatible. Further, compatibility can be based on, for example, whether the names of disciplines match. Two disciplines having the same names are compatible, whereas two disciplines having different names are not compatible. Persons skilled in the art will appreciate that compatibility tests can be based on other parameters.

Otherwise, step 430 results in a determination that the port is associated with an undetermined discipline. This corresponds to case or row number 2 in the Table of FIGS. 6A-B, in which the higher level net is digital (D), but the lower level port is undetermined (U). Thus, after step 230, the net and port may or may not be compatible, but it is known that they are within the same digital island. In this case, unlike case 1, the digital (D) net is propagated down to a lower level port in step 250 so that the undetermined discipline is replaced with a discrete discipline, and the compatibility check step 260 results in the net and the port being compatible with each other.

Returning to step 420, if it is determined that the higher level net is associated with an undetermined discipline, then in step 440, a determination is made whether the port is also associated with an undetermined discipline.

In step 445, it is determined that the discipline is known and the port is digital. This corresponds to case or row 7 of the Table of FIGS. 6A-B. In this case, the discipline of the higher level net is undetermined, but the discipline of the lower level port is known and digital. Thus, after step 230 (FIG. 2), it can be determined that the net and port may be compatible. Step 250 (FIG. 2) results in the digital (D) discipline of the port being propagated up to the higher level net, and step 260 results in the net and port being compatible with each other.

Otherwise, the result of step 440 is that the discipline of the port is also undetermined, and this corresponds to case or row 8 of the Table shown in FIGS. 6A-B. In this case, both the net and port are associated with an undetermined discipline, and the result of step 230 is that the net and port may be compatible since both are undetermined. The propagation step (250) is performed with two possible outcomes. First, if a digital discipline is present within the same digital island, then that digital discipline is propagated to a higher level net and, in addition, to the lower level port. Thus, the same discipline can be propagated in two different hierarchical directions. Step 260 (FIG. 2) results in the same result as case or row number 1 of the Table of FIGS. 6A-B. Second, if there is no digital discipline on any net within the same digital island, then the higher level net and lower level port both remain in the same undetermined "U" state. Accordingly, step 260 (FIG. 2) results in the net and port being compatible if the higher level net and the lower level port are both U. This can happen to interconnect nets that are not connected to any nets that belong to a block that operates under a specific supply voltage (or any such operating condition), and is listed for completeness.

Compatibility Check

Figure 5:
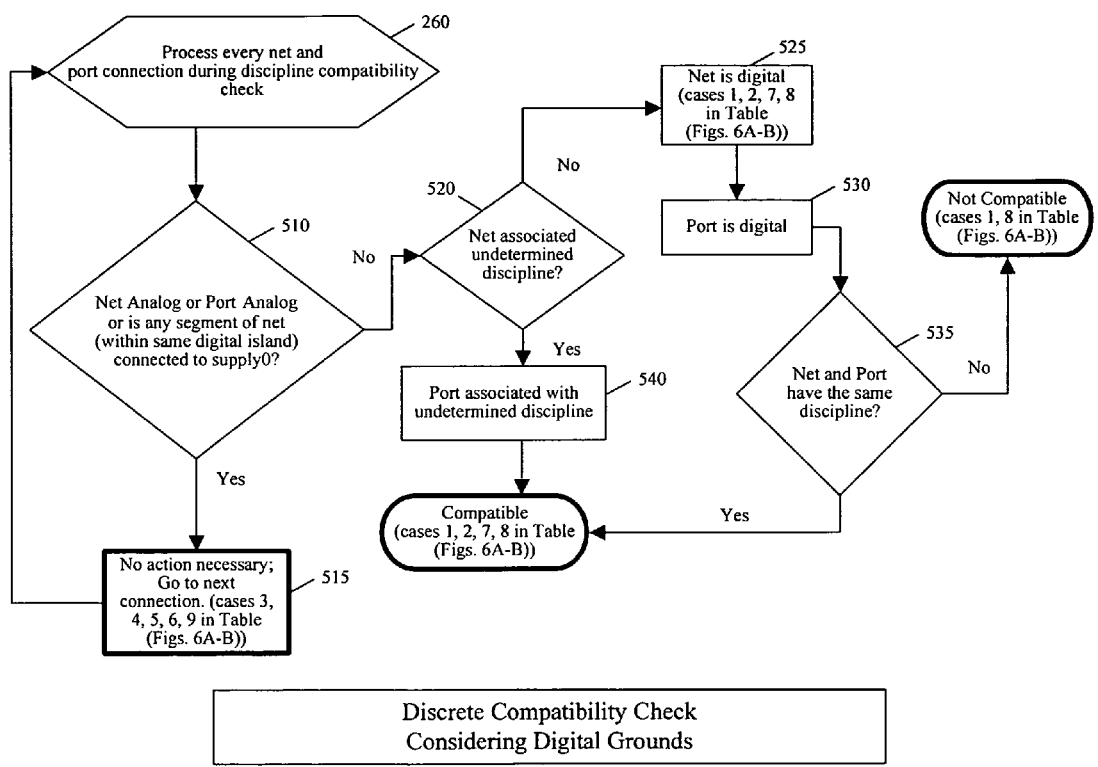
FIG. 5 is a flow chart further illustrating a method of checking discipline compatibility while considering digital grounds according to one embodiment.

FIG. 5 illustrates how digital grounds, such as supply0 nets, can be disabled according to one embodiment with regard to the step of applying a compatibility check (step 260 of FIG. 2). In step 510, a determination is made whether a net or a port is analog (or whether any segment of a net, such as a net within a digital island, is connected to supply0 or digital ground.) If so, then in step 515, no action is necessary since embodiments are applied exclusively to digital nets. This corresponds to rows or cases 3-6 and 9 of the Table of FIGS. 6A-B.

Otherwise, in step 520, a determination is made whether a net is associated with an undetermined discipline. If not, then it is determined in step 525 that the net is digital, corresponding to cases or rows 1, 2, 7 and 8 of the Table of FIGS. 6A-B. Continuing with step 530, a determination is made that the port is also digital as a result of the propagation method. and in step 535, a determination is made whether the digital net and digital port have the same discipline. For example, there may be a situation in which, due to the nature of the discrete discipline propagation, disciplines from different blocks may be propagated and reach a point where two disciplines from two different blocks meet at the same point. If it is determined that the disciplines are different, then the net and the port are not compatible, as reflected in cases 1 and 8 in the Table of FIGS. 6A-B. Otherwise, if the disciplines are the same, then this corresponds to cases 1, 2, 7, 8 of the Table of FIGS. 6A-B, each of which has compatible disciplines.

Returning to step 520, if it is determined that the net is associated with an undetermined discipline, then in step 540, the port is also associated with an undetermined discipline. This also corresponds to cases 1, 2, 7 and 8 of the Table of FIGS. 6A-B, and corresponds to the compatible results of these cases.

Example Implementation—1.8 and 3.2 Volt Disciplines

Figure 7:
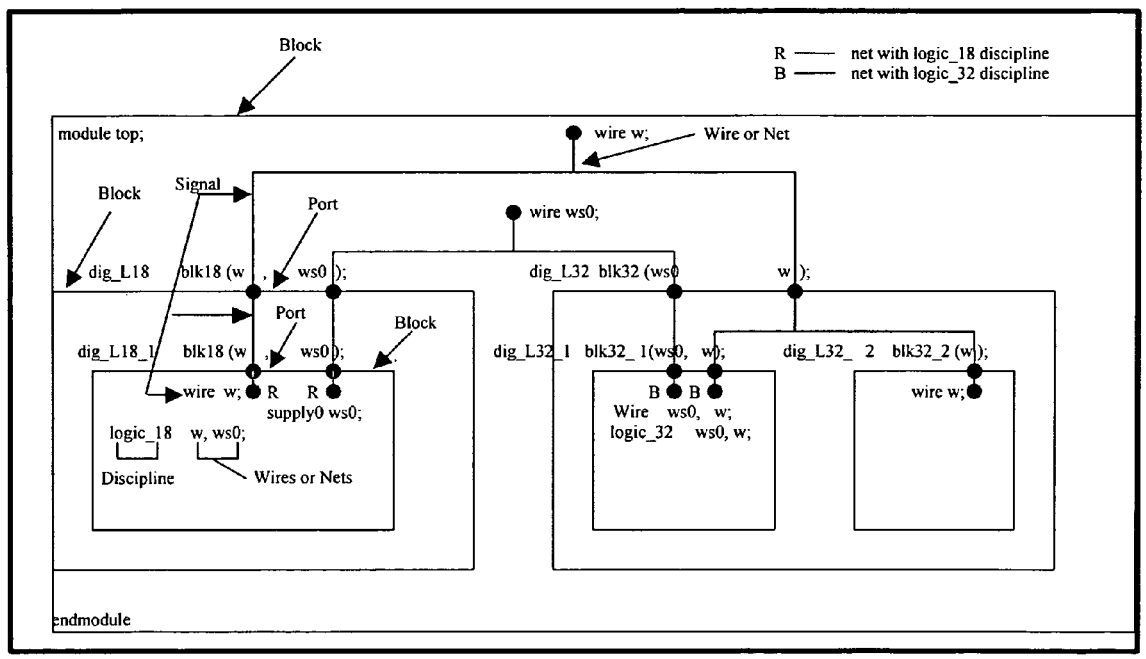
FIG. 7 is a circuit diagram of digital blocks and associated wires and nets.

FIGS. 7-15 are circuit diagrams of digital blocks and how embodiments are implemented to identify incompatibilities between nets. Referring to FIG. 7, an exemplary property or object, a "discrete discipline" defined by Verilog-AMS language, is applied to model nets that are associated with a particular supply voltage (step 230 of FIG. 2). In the example shown in FIG. 7, the discrete discipline 'logic_18' is used to describe a net in the design block which uses a supply voltage of 1.8V, and the discrete discipline 'logic_32' is used to describe a net in the design block which uses a supply voltage of 3.2V.

Verilog-AMS language semantics are applied to determine the discipline (if any) and domain of every net used in the design (step 230 of FIG. 2). For purposes of explanation and illustration, this specification describes language semantics relating to two discipline resolution methods: default discipline resolution and detailed discipline resolution. Implementations of embodiments are discussed below using both default discipline resolution and detailed discipline resolution.

Example Implementation—Default Discipline Resolution

Figure 8:
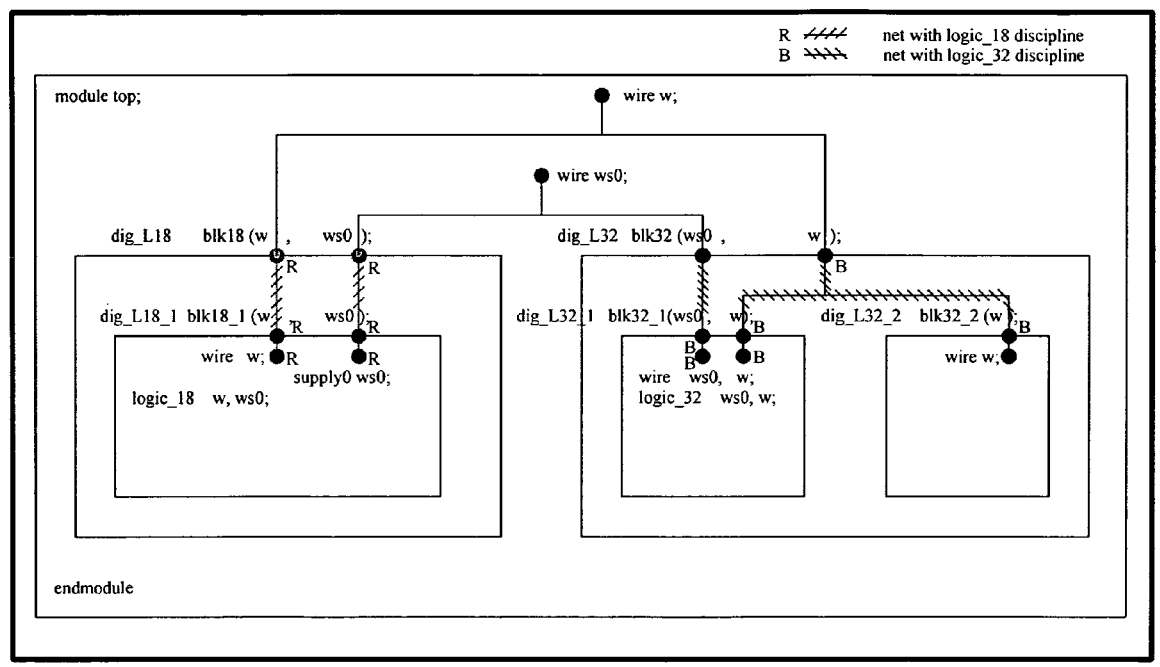
FIG. 8 is a circuit diagram of digital blocks illustrating a result of applying Verilog-AMS language semantics with default discipline resolution according to one embodiment.

FIGS. 8-11 illustrate an example of implementing embodiments of the invention using default discipline resolution. Default resolution is generally used when the designer wants to propagate analog or digital disciplines up the hierarchy. The result of applying the Verilog-AMS language semantics with the default discipline resolution method is shown in FIG. 8.

At this point, all nets that have a declared discipline or resolved discipline (due to discipline resolution method) are known. The nets that do not have an associated discipline will be digital-domain nets. The next step is applying discrete discipline propagation (step 250 of FIG. 2) to prepare the design for discrete discipline compatibility checks (step 260 of FIG. 2). Discrete discipline propagation does not actually assign any disciplines to nets without known discipline. Rather, discrete discipline information is propagated for nets that are connected at various hierarchal levels.

Figure 9:
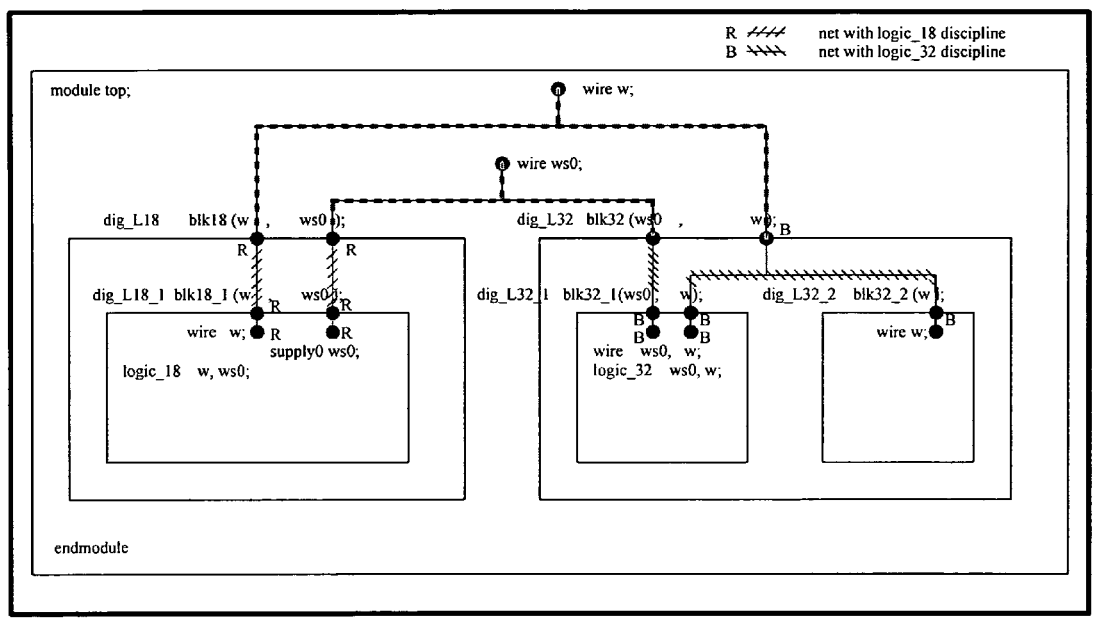
FIG. 9 is a circuit diagram of digital blocks illustrating a result of bottom-up discrete discipline propagation with default discipline resolution according to one embodiment.

The first part of the discrete discipline propagation method is performing bottom-up discrete discipline propagation. The result of this step is shown in FIG. 9, in which the dotted line (- - - - - -) indicates that the wires w and ws0 do not have a discrete discipline "assigned" to them, but that nets propagate discrete discipline (and its corresponding net) information across the hierarchy to these wires. In particular, the wire 'w' in top-level instance 'top' receives a propagated discrete discipline of 'logic__18' from the net 'top.blk18.w', and the wire 'ws0' in the top-level instance 'top' receives a propagated discrete discipline of 'logic18' from the net 'top.blk18.ws0'.

Figure 10:
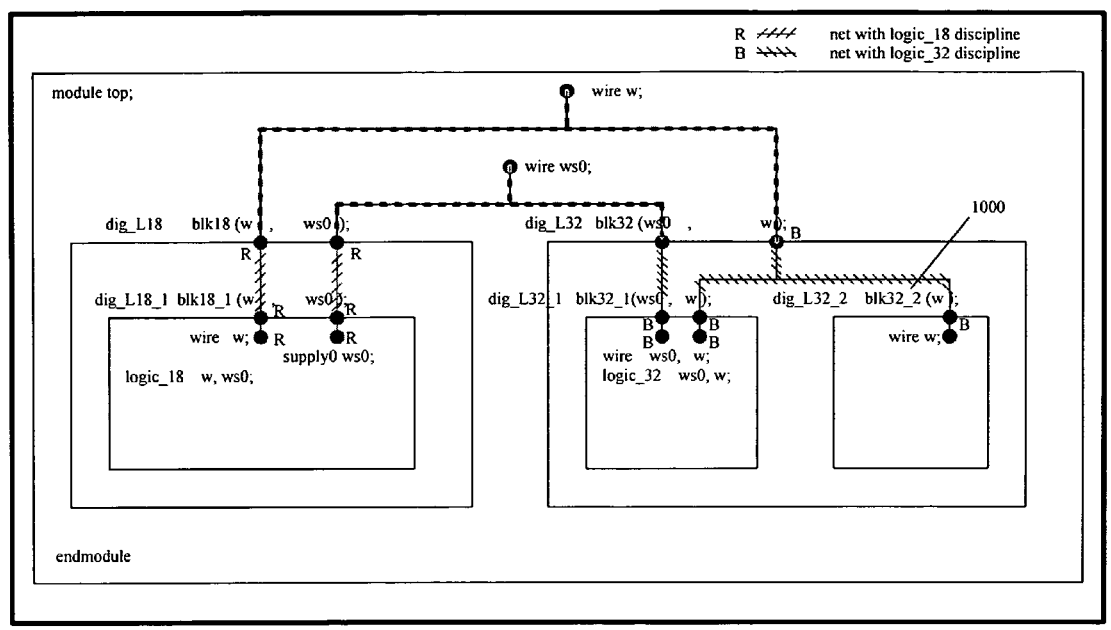
FIG. 10 is a circuit diagram of digital blocks illustrating a result of top-down discrete discipline propagation with default discipline resolution according to one embodiment.

Referring to FIG. 10, bottom-up propagation can be followed by a top-down discrete discipline propagation. As a result of top-down propagation, the wire 'w' in instance 'blk32__2' has a propagated discrete discipline of 'logic__32' from the net 'top.blk32.w'. The discrete discipline compatibility check method (step 260 of FIG. 2) is executed to determine any hierarchical connections with incompatible discrete disciplines. Every net/port connection of an instance is checked for incompatibility in a complete design traversal. It is not necessary to check digital grounds, i.e., supply0 net or a net connected to a supply0 net, for discrete discipline incompatibility. In this example, one of the hierarchical segments of the top-level net 'ws0' is declared to be 'supply0'. Thus, it is not required to conduct discrete discipline compatibility checks on net segments of 'ws0'.

Figure 11:
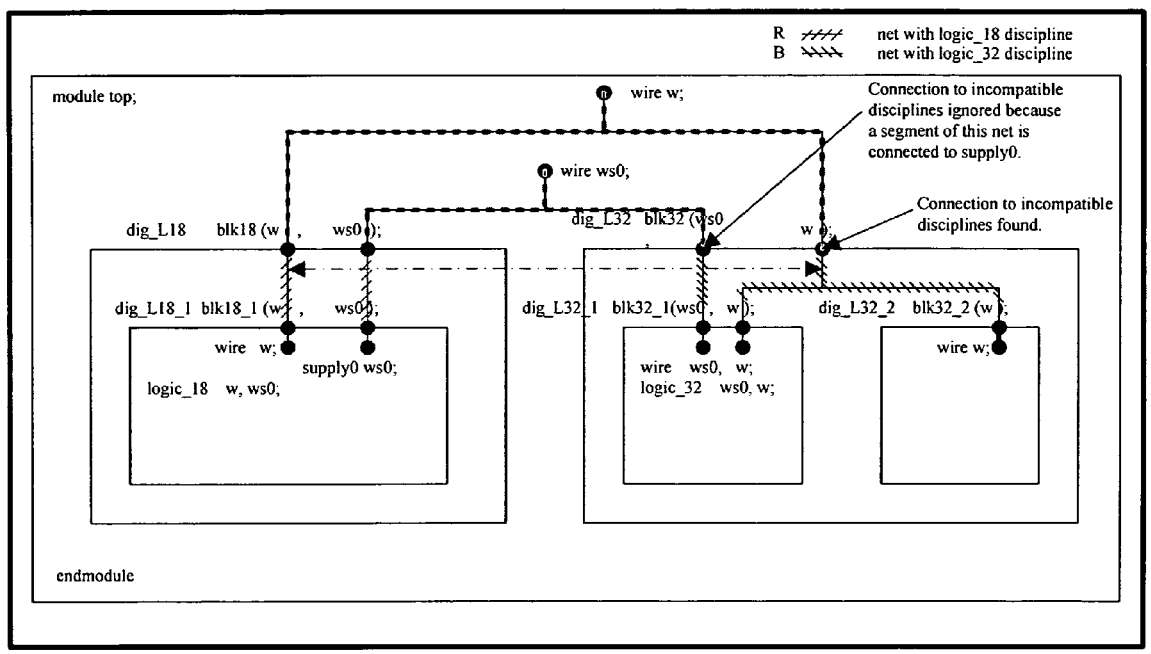
FIG. 11 is a circuit diagram of digital blocks illustrating a result of a discrete discipline compatibility check method on the design with default discipline resolution according to one embodiment.

FIG. 11 shows the result of discrete discipline compatibility checks on the exemplary circuit design. An incompatible discrete discipline connection was identified when processing the connection for port 'w' on instance blk32. A suitable incompatibility error or warning can be generated with the information that the net 'top.blk18.w' 920 of discrete discipline 'logic__18' is connected to the net 'top.blk32.w' of discrete discipline 'logic_32' (as indicated by dotted line)

Example Implementation—Detailed Discipline Resolution

FIGS. 12-15 illustrate an example of implementing embodiments of the invention using detailed discipline resolution. Detailed resolution is generally used when the designer wants to propagate analog disciplines both up and down the hierarchy and enables domainless nets to acquire analog disciplines.

Figure 12:
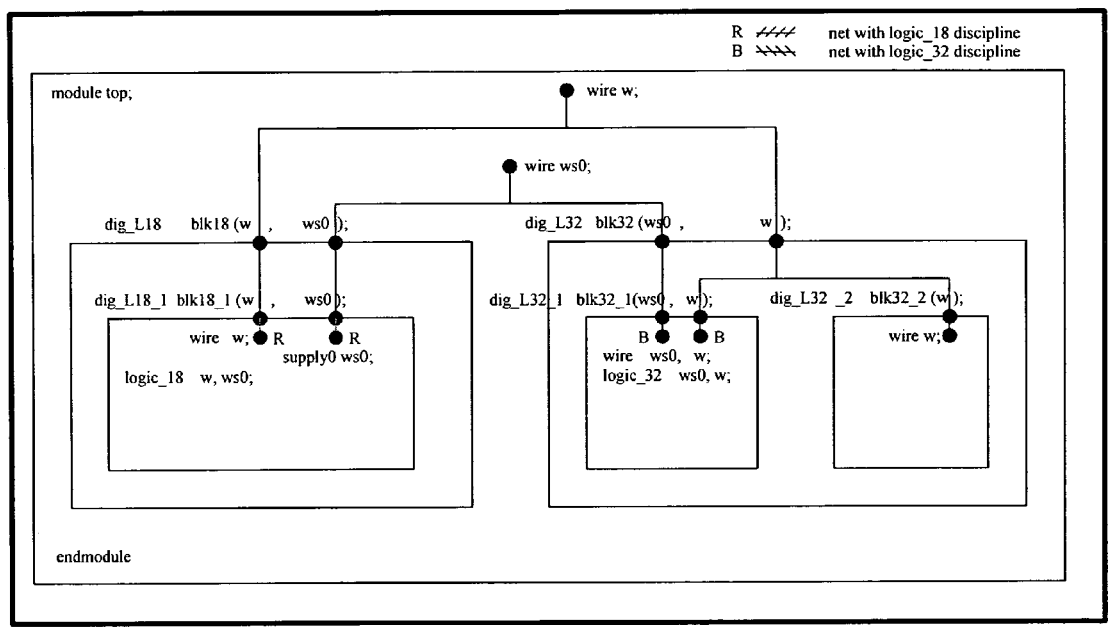
FIG. 12 is a circuit diagram of digital blocks illustrating a result of applying Verilog-AMS language semantics with detailed discipline resolution according to one embodiment.

FIG. 12 illustrates the result of applying Verilog-AMS language semantics (step 230 of FIG. 2) with detailed discipline resolution. At this point, all nets that have a declared discipline or resolved discipline (due to discipline resolution method) are known, and nets that do not have an associated discipline are digital-domain nets only.

Discrete discipline propagation (step 250 of FIG. 2) is applied to prepare the circuit design for discrete discipline compatibility checks (step 260 of FIG. 2). Discrete discipline propagation does not assign any discrete disciplines to nets without disciplines. Rather, the propagation step propagates discrete discipline information of nets that are connected at various levels of hierarchy.

Figure 13:
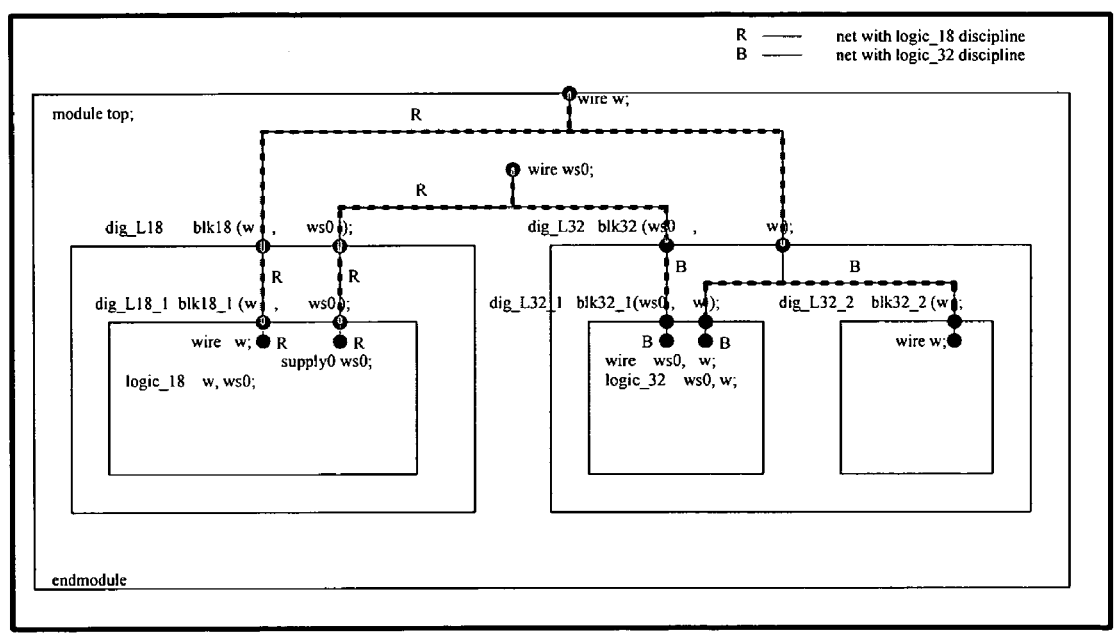
FIG. 13 is a circuit diagram of digital blocks illustrating a result of bottom-up discrete discipline propagation with detailed discipline resolution according to one embodiment.

According to one embodiment, the first part of discrete discipline propagation is performing bottom-up discrete discipline propagation, the result of which is shown in FIG. 13. The dotted-line in FIG. 13 indicates that the wires top.blk18.w and top.blk18__1 do not have a discrete discipline "assigned" to them but nets propagate discrete discipline information across the hierarchy. In particular, wire 'top.blk18.w' receives a propagated discrete discipline of 'logic__18' from the net 'top.blk18.blk18__1.w' which, in turn, is propagated to the net 'top.w'. The wire 'top.blk18__1' receives a propagated discrete discipline of 'logic__18' from the net 'top.blk18.blk18__1.ws0' which, in turn, is propagated to the net 'top.ws0'. The wire 'top.blk32.w' receives a propagated discrete discipline of 'logic__32' from the net 'top.blk32.blk32__1.w', and the wire 'top.blk32.ws0' receives a propagated discrete discipline of 'logic__32' from the net 'top.blk32.blk32__1.ws0'.

Figure 14:
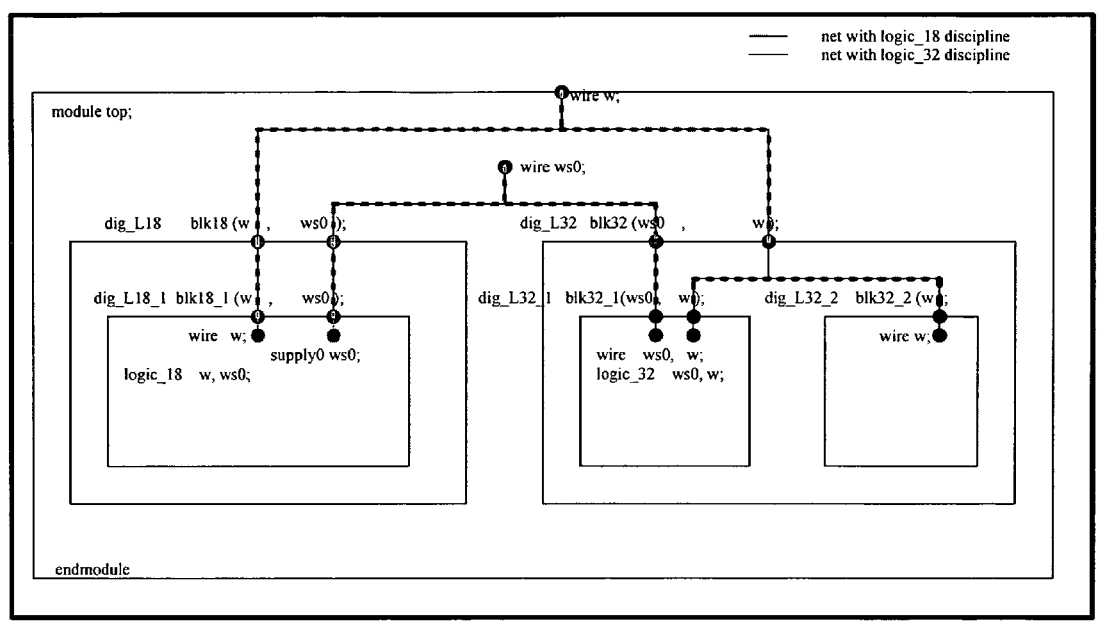
FIG. 14 is a circuit diagram of digital blocks illustrating a result of top-down discrete discipline propagation with detailed discipline resolution according to one embodiment.

A top-down discrete discipline propagation is performed, the result of which is shown in FIG. 14. The wire 'w' in instance 'top.blk32.blk32__2' has a propagated discrete discipline of 'logic__32' from the net 'top.blk32.w'. Discrete discipline compatibility checks (step 240 of FIG. 2) are executed to determine hierarchical connections with incompatible discrete disciplines. Every net/port connection of an instance is checked for incompatibility in a complete design traversal. It is not required to check supply0 nets or a nets connected to a supply0 net for discrete discipline incompatibility.

Figure 15:
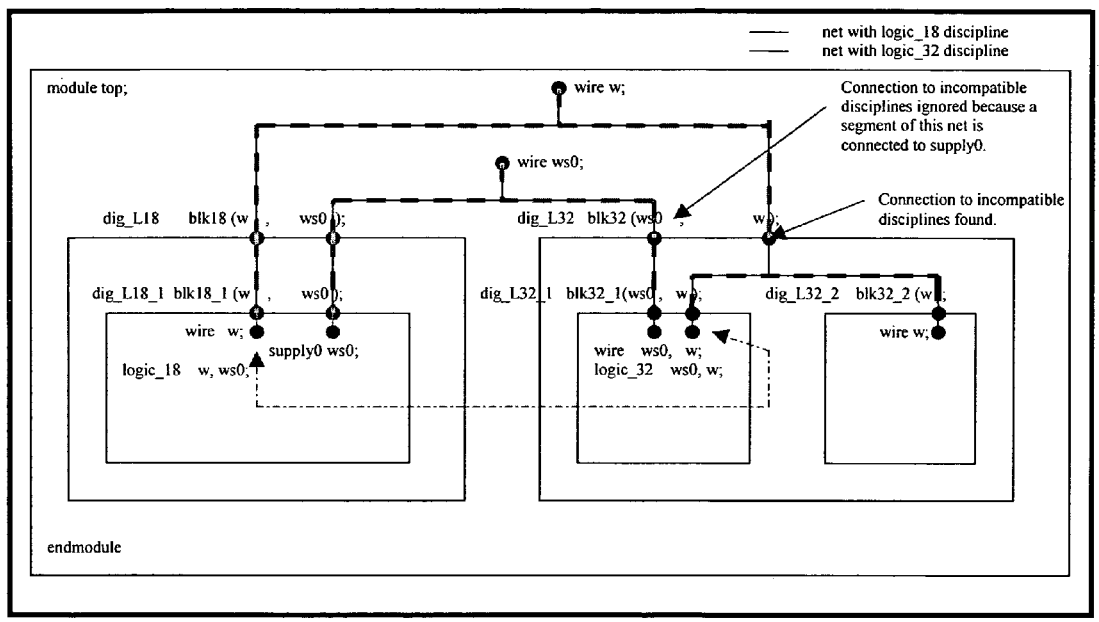
FIG. 15 is a circuit diagram of digital blocks illustrating a result of a discrete discipline compatibility check method on the design with detailed discipline resolution according to one embodiment.

In this example, one of the hierarchical segments of the top-level net 'ws0' is declared to be 'supply0'. Thus, the discrete discipline compatibility check will not be performed on any of the net segments of 'ws0'. The result of discrete discipline compatibility check method on the design is shown in FIG. 15. An incompatible discrete discipline connection was found when processing the connection for port 'w' on instance 'top.blk32'. An appropriate incompatibility error or warning can be generated with the information that the net 'top.blk18.blk18__1.w' of discrete discipline 'logic__18' is connected to the net 'top.blk32.blk32__1.w' of discrete discipline 'logic__32'.

Various advantages and benefits of embodiments over known systems and method are evident and satisfy the unmet needs of known verification systems and methods. For example, with embodiments, verification can be performed without running simulations, and without the time and costs associated with simulations. Instead, embodiments can be applied while computing design connectivities (i.e. design elaboration). Further, no new design units/blocks or major design modifications are needed when using embodiments.

A further benefit of embodiments is that they can be applied on pure digital designs, as well as mixed signal digital/analog designs. Another advantage that embodiments provide is increasing functional coverage compared to known techniques. Embodiments can work on the entire design without skipping or passing over other portions of the circuit design, thus leading to complete functional coverage and increasing the quality of design validation. Further, embodiments provide the ability to identify nets that are connected to a digital ground, such as Verilog digital 'supply0' and disable compatibility checks for these grounded nets. Embodiments also follow Verilog-AMS Standard, and is compliant with Verilog-AMS LRM. These advantages can be achieved without changing semantics of established languages.

Although this specification provides one example implementation of embodiments using a discipline of Verilog-AMS, alternative embodiments are directed to the use of any non-Verilog-AMS discrete property or object from various other languages, such as VHDL, SystemC, SystemVerilog or any variants thereof), as necessary, to perform discrete discipline compatibility checks. Embodiments are also independent of various discipline resolution methods and can be implemented independently of the Verilog-AMS discipline resolution process. Further, embodiments can be applied even when no discipline resolution is performed. Thus, embodiments can work with Verilog-AMS language standard methods or variations thereof. Additionally, semantics of digital discipline compatibility checks may be changed to reflect changes in the semantics of discipline in the Verilog-AMS standard language, but the underlying concept of applying discipline compatibility checks to verify multiple supply designs remains unaffected.

Discrete discipline compatibility checks enable faster, higher-level abstraction to represent nets that are connected to various power supplies in the circuit design and to validate connections in the design much earlier in the design chain. Embodiments also add supply-domain sensitivity by identifying digital blocks requiring different supply sensitivities with different discrete disciplines. These discrete disciplines can be used to insert an appropriate connect module by writing appropriate connect rules. See, e.g., connectrules myrule;
    connect L2E__18 input logic__18 output electrical;
    connect L2E__32 input logic__32 output electrical;
endconnectrules In the above connect rule, the discrete disciplines are used to identify connections between digital and analog for different supply sensitivities. The connect modules "L2E_logic18" and "L2E_logic32" are then used to do the necessary signal conversion for each supply sensitivity type.

In the foregoing specification, the embodiments have been described with reference to specific elements and steps thereof. It will, however, be evident that various modifications and changes may be made thereto without departing from the broader spirit and scope of the embodiments. For example, it is to be understood that the specific ordering and combination of process actions shown in the process flow diagrams described herein are merely illustrative, and that or additional process actions, or a different combinations and/or ordering thereof can be used. Further, this specification describes discrete discipline propagation and discrete discipline compatibility check as separate steps, however, in an alternative embodiment, these steps can be combined together. Additionally, the use of a discrete discipline in Verilog-AMS or another suitable discrete property or object in another HDL can be used to represent or model a net that belongs to a particular supply network. Moreover, embodiments can be applied to various operating parameters of a circuit design, including power supplies, clocks and other similar properties that influence design behavior. Accordingly, the specific examples of applying embodiments to particular operating parameters are not intended to be limiting.

What is claimed is:

1. A computer implemented method for verifying circuit design connectivity or functionality, comprising:
using a processor configured for:
defining a discrete property associated with a value of an operating parameter of the circuit design, wherein
the discrete property indicates the digital or analog nature of a net that corresponds to the operating parameter, and
the discrete property is used to identify at least one of multiple different supply sensitivities or at least one of multiple different supply voltages in the circuit design;
associating the discrete property with respective one or more first digital nets of the circuit design so that the respective one or more first digital nets are associated with respective one or more values, domains, or sensitivities of the discrete property;
verifying the connectivity or the functionality between two or more components of the circuit design based at least in part on whether the discrete property associated with a first net or one of the two or more components of the first net is compatible with that of a second net or another of the two or more components of the second net while eliminating a need for simulation;
resolving one or more incompatible discrete disciplines by propagating the discrete discipline up and down a plurality of hierarchies for one or more undetermined nets or components to acquire the discrete discipline or one or more other discrete disciplines; and
using a display apparatus configured for displaying a result of the act of verifying the connectivity or the functionality or using a computer readable storage medium or a computer storage device configured for storing the result.

2. The computer implemented method of claim 1, further comprising:
identifying one or more second digital nets of the circuit design that are not associated with the discrete property or a second discrete property; and
associating the one or more second digital nets with the discrete property or the second discrete property so that each of the one or more second digital nets are associated with the discrete property or the second discrete property and a corresponding value, domain, or sensitivity.

3. The computer implemented method of claim 2, the act of identifying the one or more second digital nets comprising identifying the one or more second digital nets within a digital island that are not associated with the discrete property or the second discrete property, wherein the digital island includes the one or more second digital nets that extend through different hierarchical levels of the circuit design.

4. The method of claim 2, wherein the act of associating the discrete property comprises propagating the discrete property from a lower hierarchical level to a higher hierarchical level.

5. The method of claim 2, wherein the act of associating the discrete property comprises propagating the discrete property from a higher hierarchical level to a lower hierarchical level.

6. The method of claim 2, wherein before the act of associating the discrete property, the method further comprises traversing the circuit design to identify one or more net-port connections of the circuit design.

7. The method of claim 6, wherein the act of associating the discrete property comprises propagating the discrete property between a net and a port.

8. The method of claim 6, wherein the act of traversing the circuit design comprises traversing the circuit design from a bottom hierarchical level up to a top hierarchical level of the circuit design.

9. The method of claim 6, wherein the act of traversing the circuit design comprises traversing the circuit design from a top hierarchical level down to a bottom hierarchical level of the circuit design.

10. The method of claim 6, in which the act of traversing the circuit design comprising:
traversing the circuit design from a top hierarchical level down to a bottom hierarchical level of the circuit design; and
traversing the circuit design from the top hierarchical level down to the bottom hierarchical level of the circuit design.

11. The method of claim 1, wherein the act of verifying comprises verifying whether one or more discrete properties of one or more digital domains are compatible, the one or more discrete properties comprising the discrete property.

12. The method of claim 1, wherein the act of verifying comprises verifying whether one or more operating parameter values of one or more discrete properties are compatible, the one or more discrete properties comprising the discrete property.

13. The method of claim 1, wherein the act of verifying comprises verifying whether one or more discrete properties of one or more digital domains and one or more operating parameter values of the one or more discrete properties are compatible, the one or more discrete properties comprising the discrete property.

14. The method of claim 1, wherein the act of verifying comprises verifying the connectivity or the functionality between blocks of the circuit design.

15. The method of claim 1, the act of verifying being performed exclusively the on one or more first digital nets.

16. The method of claim 1 being performed without simulation.

17. The method of claim 1, wherein the operating parameter comprises a voltage.

18. The method of claim 1, wherein the operating parameter comprises a clock speed.

19. The method of claim 1, wherein the discrete property comprises a discrete discipline.

20. The method of claim 1, wherein the discrete property is user-definable.

21. The method of claim 1, wherein the discrete property is pre-determined.

22. The method of claim 1, wherein a discrete property is assigned to all of the one or more first digital nets of the circuit design.

23. The method of claim 1, wherein the discrete property is assigned to a plurality of first digital nets of the circuit design.

24. The method of claim 1, the act of verifying being performed without analyzing digital grounds.

25. The method of claim 1, wherein the circuit design is a digital circuit design.

26. The method of claim 1, wherein the circuit design is a digital/analog mixed-signal circuit design.

27. A computer implemented method for verifying circuit design connectivity or functionality, comprising:
    using a processor configured for:
        defining a discrete discipline for each value of an operating parameter of the circuit design, wherein
            the discrete discipline indicates the digital or analog domain of a net that corresponds to the operating parameter, and
            the discrete property is used to identify at least one of multiple different supply sensitivities or at least one of multiple different supply voltages in the circuit design;
        associating the discrete discipline with respective one or more first digital nets in the circuit design so that the one or more first digital nets are associated with respective one or more values, domains, or sensitivities of the discrete discipline;
        identifying a plurality of second digital nets within a digital island of the circuit design that are associated with an undetermined discipline, wherein the digital island includes the plurality of second digital nets that extend through different hierarchical levels of the circuit design;
        associating each of the plurality of second digital nets with the discrete discipline so that the each of the plurality of second digital nets is associated with a corresponding value, domain, or sensitivity of the discrete discipline;
        verifying the connectivity or the functionality between one or more circuit design blocks based at least in part on whether the corresponding value, domain, or sensitivity of the discrete discipline associated with one of the one or more circuit design blocks is compatible with another corresponding value, domain, or sensitivity associated with a second one of the one or more circuit design blocks while eliminating a need for simulation;
        resolving one or more incompatible discrete disciplines by propagating the discrete discipline up and down a plurality of hierarchies for one or more undetermined nets or components to acquire the discrete discipline or one or more other discrete disciplines; and
        using a display apparatus configured for displaying a result of the act of verifying the connectivity or the functionality or using a computer readable storage medium or a storage device configured for storing the result.

28. The method of claim 27, the act of associating the each of the plurality of second digital nets with the discrete discipline comprising propagating the discrete discipline from a lower hierarchical level to a higher hierarchical level.

29. The method of claim 27, the act of associating each of the plurality of second digital nets with the discrete discipline comprising propagating the discrete discipline from a higher hierarchical level to a lower hierarchical level.

30. The method of claim 27, before the act of associating each of the plurality of second digital nets with the discrete discipline, the method further comprising traversing the circuit design to identify one or more net-port connections of the circuit design.

31. The method of claim 30, the act of associating each of the plurality of second digital nets with the discrete discipline comprising propagating the discrete discipline between a net and a port.

32. The method of claim 30, the act of traversing comprising traversing the circuit design from a bottom hierarchical level up to a top hierarchical level of the circuit design.

33. The method of claim 30, the act of traversing comprising traversing the circuit design from a top hierarchical level down to a bottom hierarchical level of the circuit design.

34. The method of claim 30, in which the act of traversing comprising:
    traversing the circuit design from a top hierarchical level down to a bottom hierarchical level of the circuit design; and
    traversing the circuit design from the top hierarchical level down to the bottom hierarchical level of the circuit design.

35. The method of claim 27, the act of verifying comprising verifying whether a plurality of discrete disciplines of one or more digital domain are compatible with one another, the plurality of discrete disciplines comprise the discrete discipline.

36. The method of claim 27, the act of verifying comprising verifying whether a plurality of operating parameter values of one or more discrete disciplines are compatible with one another, the one or more discrete disciplines comprise the discrete discipline.

37. The method of claim 27, the act of verifying comprising verifying whether one or more discrete disciplines of one or more digital domains and one or more operating parameter values of discrete disciplines are compatible, the one or more discrete disciplines comprise the discrete discipline.

38. The method of claim 27, the act of verifying being performed exclusively on one or more first digital nets.

39. The method of claim 27 being performed without simulation.

40. The method of claim 27, wherein the operating parameter comprises a voltage.

41. The method of claim 27, wherein the operating parameter comprises a clock speed.

42. The method of claim 27, wherein the discrete property is assigned to all of the plurality of second digital nets of the circuit design.

43. The method of claim 27, wherein the discrete property is assigned to the plurality of second digital nets of the circuit design.

44. The method of claim 27, the act of verifying being performed without analyzing one or more digital grounds.

45. The method of claim 27, wherein the circuit design is a digital circuit design.

46. The method of claim 27, wherein the circuit design is a digital/analog mixed-signal circuit design.

47. A computer system for verifying circuit design connectivity or functionality, comprising:
a processor configured for performing:
defining a discrete discipline for each value of an operating parameter of the circuit design, wherein
the discrete discipline indicates the digital or analog nature of a net that corresponds to the operating parameter, and
the discrete discipline is used to identify at least one of multiple different supply sensitivities or at least one of multiple different supply voltages in the circuit design;
associating the discrete discipline with respective one or more first digital nets in the circuit design so that the one or more first digital nets are associated with respective one or more values of the discrete discipline;
identifying a plurality of first digital nets within a digital island of the circuit design that are associated with an undetermined discipline, wherein the digital island includes the plurality of first digital nets that extend through different hierarchical levels of the circuit design;
associating each of the plurality of first digital nets with the discrete discipline so that the each of the plurality of first digital nets is associated with a corresponding value, domain, or sensitivity of the discrete discipline;
verifying the connectivity or the functionality between one or more circuit design blocks based at least in part on whether the corresponding value, domain, or sensitivity of the discrete discipline associated with one of the one or more circuit design blocks is compatible with another corresponding value, domain, or sensitivity associated with a second one of the one or more circuit design blocks while eliminating a need for simulation;
resolving one or more incompatible discrete disciplines by propagating the discrete discipline up and down a plurality of hierarchies for one or more undetermined nets or components to acquire the discrete discipline or one or more other discrete disciplines; and
a display apparatus configured for displaying a result of the processor performing the act of verifying the connectivity or the functionality or a computer readable storage medium or a computer storage device configured for storing the result.

48. The system of claim 47, wherein the processor's performing the act of verifying comprises verifying whether one or more discrete disciplines of one or more digital domains are compatible.

49. A computer system for verifying circuit design connectivity or functionality, comprising:
a processor configured for:
defining a discrete discipline for a value of an operating parameter of the circuit design, wherein
the discrete discipline indicates the digital or analog nature of a net that corresponds to the operating parameter, and
the discrete discipline is used to identify at least one multiple different supply sensitivities or at least one multiple different supply voltages in the circuit design;
associating the discrete property with respective one or more first digital nets of the circuit design so that the respective one or more first digital nets are associated with respective one or more values, domains, or sensitivities of the discrete property;
verifying the connectivity or the functionality between two or more components of the circuit design based at least in part on whether the discrete property associated with one of the two or more components is compatible with that of another of the two or more components belongs while eliminating a need for simulation;
resolving one or more incompatible discrete properties by propagating the discrete property up and down a plurality of hierarchies for one or more undetermined nets or components to acquire the discrete property or one or more other discrete properties; and
a display apparatus configured for displaying a result of the processor's performing the act of verifying the connectivity or the functionality or a computer readable storage medium or a computer storage device configured for storing the result.

50. The system of claim 49, the processor's performing the act of verifying comprising verifying whether one or more discrete disciplines of one or more digital domains are compatible.

* * * * *